July 10, 1945.    P. H. SCHOEPFLIN ET AL    2,379,932
HEAT EXCHANGE DEVICE
Filed Feb. 18, 1944    2 Sheets-Sheet 1
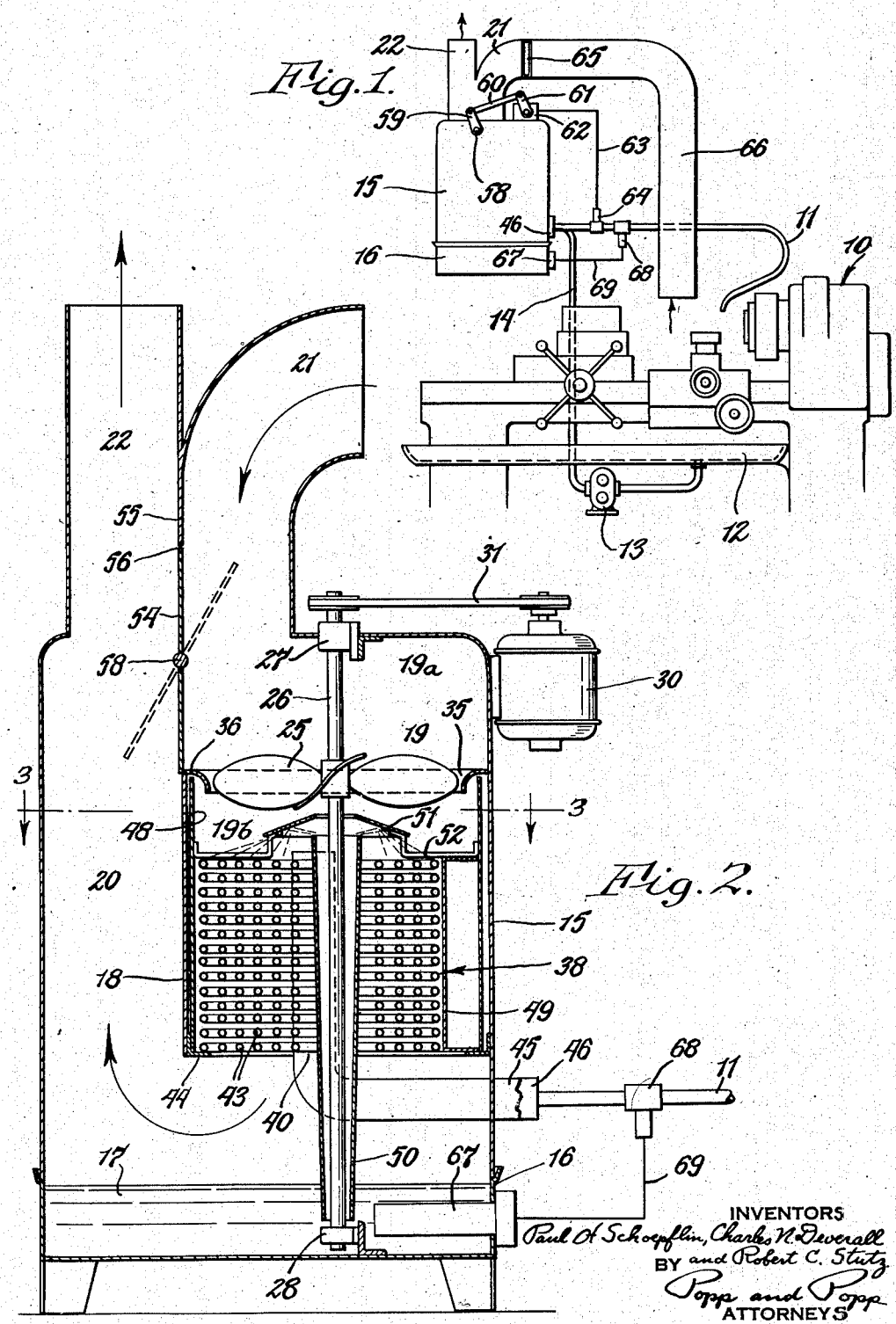
INVENTORS
Paul H. Schoepflin, Charles N. Deverall
BY and Robert C. Stutz
Popp and Popp
ATTORNEYS

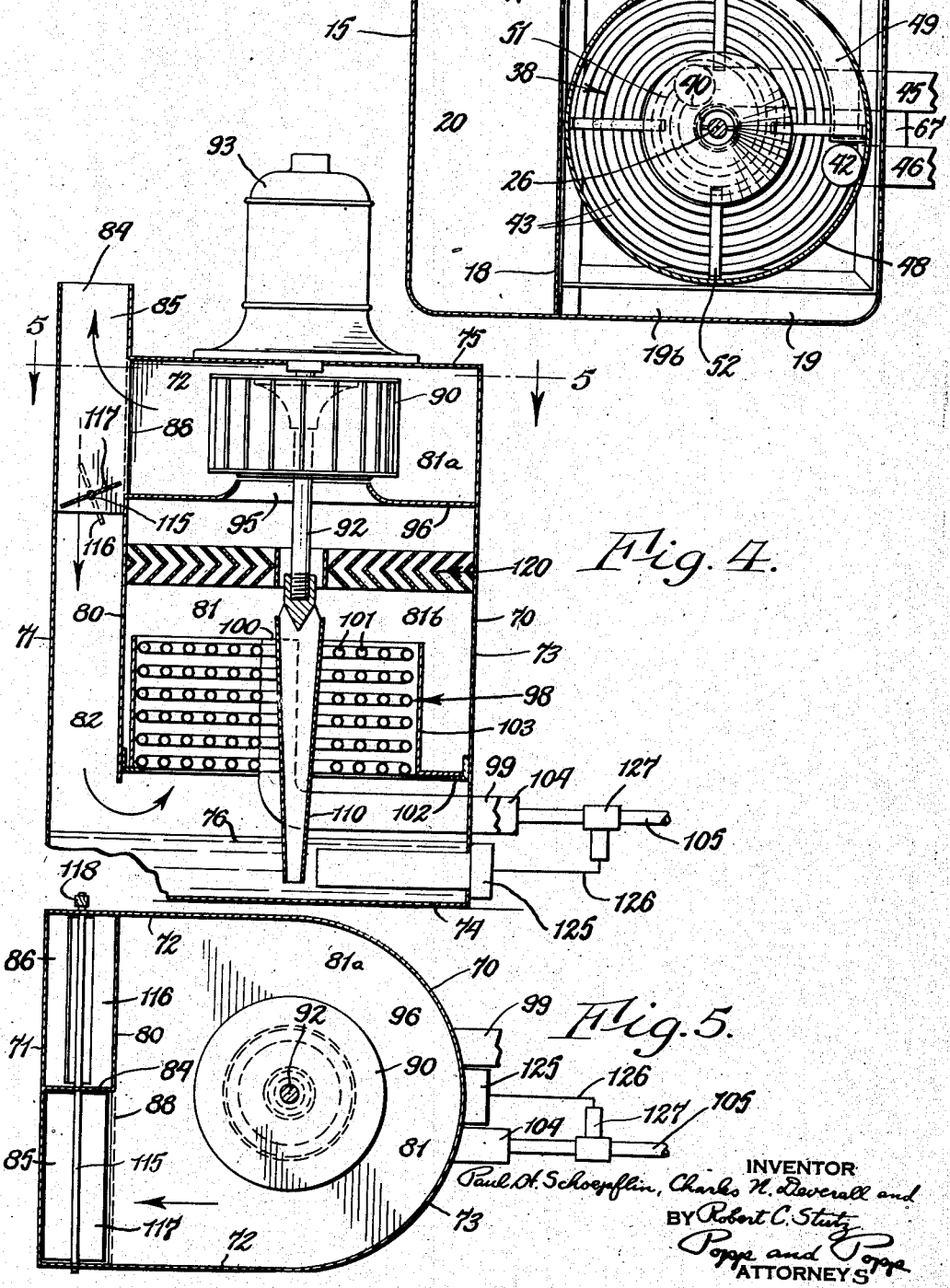

Patented July 10, 1945

2,379,932

UNITED STATES PATENT OFFICE 2,379,932

HEAT EXCHANGE DEVICE

Paul H. Schoepflin, New York, and Charles N. Deverall and Robert C. Stutz, Buffalo, N. Y., assignors to Niagara Blower Company, Buffalo, N. Y., a corporation of New York Application February 18, 1944, Serial No. 522,880

13 Claims. (Cl. 62—168)

This invention relates to a heat exchange device for maintaining a fluid in a selected temperature range determined by the character of the fluid and more particularly is shown, as an example of its use, as embodied in a heat exchanger for maintaining the desired temperature of the cutting fluid or compound used in connection with a machine tool, such as a turret lathe, thread grinder or the like and also as drawing the dirt, dust or smudge laden air resulting from the operation of the machine tool through a filter so as to purify the air. However, the invention can be used for other purposes and the invention is therefore not to be construed as limited to any particular use or fluid to be treated except as designated in the accompanying claims.

In the operation of a machine tool, such as a turret lathe or other cutting or grinding tool, and also in wire drawing, welding and grinding, a cutting fluid, water or wire drawing compound is brought into contact with the part being operated upon to avoid excessive temperatures or to facilitate the operation. To keep this fluid in an operative condition it is necessary that the same be cooled before reuse. Further, in such operations a smudge is developed which contaminates the air in the shop.

It is accordingly one of the principal objects of the present invention to provide a simple and efficient apparatus which will cool the cutting fluid, water, or wire drawing compound used in machine tools, such as turret lathes or other cutting tools, wire drawing, welders and grinders and which will also draw the dirt, dust or the smudge laden air resulting from the operation of the machine, wire drawing, welder and grinder through a filter or the like so that it is purified before being discharged back into the enclosure in which the operation takes place.

Another object is to provide such apparatus in which the cooling effect is obtained from the evaporation of water, thereby to greatly reduce the amount of cooling water required.

Another object of the invention is to provide such an evaporative type of heat exchanger which is of small and compact form so that it can readily be located near the machine or apparatus which it serves and will not be in the way.

Another object is to provide such an evaporative type of heat exchanger which is simple in construction and can be produced at very low cost.

Another purpose of the invention is to provide such apparatus which is fully automatic in maintaining the desired temperature of the fluid being cooled and in which the temperature of this fluid is maintained within very close limits.

Another object of the invention is to provide a simple and effective control for the minimum temperature of the liquid being treated by the adjustment of the character of the air supplied to the apparatus.

Another object of the invention is to provide for heating the fluid being treated so as to bring it up to proper temperature at the start of an operation and also to prevent it from falling below this proper temperature at any time.

Another object is to provide such apparatus which will stand up under conditions of severe and constant use without getting out of order or requiring repairs.

In the accompanying drawings:

Fig. 1 is a side elevation of an evaporative type of heat exchanger embodying the present invention and showing it used in conjunction with a machine tool, such as a turret lathe, both to cool the cutting fluid or compound and also to withdraw and purify the dirt, dust and the smudge laden air resulting from the operation of the machine tool.

Fig. 2 is an enlarged vertical central section through the apparatus shown in Fig. 1 and also showing the casing as provided with feet for mounting it upon the floor.

Fig. 3 is a horizontal section, taken on line 3—3 of Fig. 2.

Fig. 4 is a fragmentary vertical section, similar to Fig. 2, showing a modified form of the heat exchanger.

Fig. 5 is a horizontal section, taken on line 5—5 of Fig. 4.

The heat exchanger embodying the present invention is shown, by way of example, as used in conjunction with a turret lathe 10, although it could be used in conjunction with any other type of machine tool or in conjunction with wire drawing, welding or grinding equipment. A cutting fluid is played upon the piece being cut from one or more pipes 11, this cutting fluid or compound serving to absorb the heat generated as a part of the cutting operation and also to facilitate the cutting. This cutting fluid is shown as collected in a pan 12 underneath the machine tool from which it is withdrawn by a pump 13 and passed through a pipe 14 to the heat exchanger embodying the present invention.

This heat exchanger, as best shown in Figs. 1–3, comprises a casing 15 which is generally of rectangular form and which is mounted upon a tank 16 forming the base of the casing, this tank 16 containing a body of water 17 which is evaporated to provide the cooling effect. Toward the rear of this casing is secured a vertical partition 18 which extends from one side wall to the other and which terminates a substantial distance above the level of the water 17. This partition 18 provides a relatively large working chamber 19 in the front of the casing and an air discharge passage 20 in the rear of the casing. Air is drawn into the working chamber 19 through an air inlet duct 21 and is discharged from the air discharge passage 20 through an outlet duct 22.

The means for drawing air in through the inlet duct 21, into the working chamber 19, and discharging the air around the underside of the partition 18 and out through the air discharge passage 20 and the discharge duct 22 comprises a fan 25 mounted upon a vertical fan shaft 26 which is shown as journaled in a bearing 27 in the top of the casing 15 and in a bearing 28 mounted on the bottom of the tank 16. This fan shaft is driven by a motor 30 mounted on the side of the casing 15, through a belt drive 31 or in any other suitable manner. The fan is shown as being of the propeller type and as arranged in a circular opening 35 in a horizontal baffle or partition 36 which divides the working chamber 19 into upper and lower chambers 19a and 19b.

Mounted within the lower chamber 19b is a cooling coil indicated generally at 38. This cooling coil is shown as comprising a vertical inlet header 40 of tubular form arranged adjacent the fan shaft 26, a similar outlet header 42 arranged adjacent the front wall of the casing 15 and a plurality of spiral tubes 43 connecting these headers and preferably arranged in substantially uniformly spaced relation to one another to permit the flow of air over their external surfaces. This coil assembly can be supported on angle irons 44 which are shown as being four in number and secured to the partition 18 and front wall of the casing 15 in position to support the coil assembly at four places. The inlet header 40 is shown as provided with an inlet pipe 45 to which the pump discharge pipe 14 connects and the outlet header 42 is shown as provided with an outlet pipe 46 to which the pipe 11 connects. The air flowing down the chamber 19b is preferably confined so as to pass in intimate contact with the tubes 43 of the coil 38 and for this purpose the coil assembly is preferably surrounded by a cylindrical sheet metal shell 48 which rests upon the angle bars 44 and preferably extends upwardly to the horizontal baffle or partition 36 which surrounds the fan 25. In addition a curving wedge-shaped sheet metal filler piece 49 may be secured inside of the cylindrical shell 48 alongside the header 42 so as to fill the free area necessarily left by the spiral form of the tubes 43.

In the heat exchanger the cooling effect is provided principally by the evaporation of water. For this purpose water is lifted from the body of water 17 in the tank 16 and discharged over the tubes 43 of the cooling coil 38 so as to keep these tubes constantly flushed with water, the excess water flowing back into the tank 16.

For this purpose a pump is provided which is in the form of a frusto-conical shell 50 which can be secured to the fan shaft 26 in any suitable manner and has its lower end of reduced diameter immersed in the body of water 17 in the tank 16. Adjacent the upper end of this pump shell 50 is arranged a stationary baffle 51 which surrounds the fan shaft 26 and the upper end of the pump shell 50 and is also of frusto-conical form. This baffle 51 can be supported on legs or bars 52 which are shown as extending radially outward and as secured to the cylindrical shell 48.

Means are provided for delivering different proportions of outside air from the duct 21 and recirculated air from the air discharge passage 20 into the upper inlet chamber 19a. For this purpose a damper 54 is provided above the vertical partition 18 in position to form a continuation of this vertical partition and the common wall 55 between the inlet and outlet ducts 21 and 22 and arranged to open and close a recirculated air opening 56 therebetween. This damper 54 is shown as mounted on a horizontal shaft 58 which can be journaled in the side walls of the casing 15 in any suitable manner and is shown as having an external operating lever 59 connected thereto, as best shown in Fig. 1. This operating lever 59 is shown as connected by a link 60 with the lever 61 of a damper motor 62. This damper motor is shown as controlled, through a line 63, from an immersion thermostat 64 in the outlet line 11 although this damper motor 62 can be controlled in any of the ways shown in the Olstad and Williams Patents Nos. 2,296,946 and 2,321,933.

As shown in Fig. 1, the heat exchanger can also be utilized to remove the rust, dirt and smudge laden air from adjacent the cutting operation and to purify this air before being returned into the enclosure. For this purpose an air filter 65 is shown as mounted across the inlet of the air inlet duct 21 and an air duct 66 is shown as leading from a point immediately above the zone of operation of the turret lathe 10 to the filter 65. As a result the dust, dirt or smudge laden air developed during the cutting operation is drawn by the heat exchanger through the duct 66 and filter 65 in which the smudge is removed so that purified and washed air is returned through the discharge duct 22 to the enclosure in which the turret lathe is operating.

Provision is also made for applying heat to the fluid being treated, so as to bring it up to proper temperature at the start of an operation and also to prevent it from falling below this proper temperature at any time. For this purpose an electric heater 67 is shown as mounted in the wall of the tank 16 and as having its heating surface immersed in the body of spray water 17 in this tank. This immersion heater is shown as being under control of another immersion thermostat 68 in the outlet line 11 through a control line 69, the thermostat 68 being set to close the circuit through the immersion heater 67 whenever the temperature of the fluid passing through line 11 drops below the proper operating temperature. However, the heat could be applied by injecting steam into the spray water, or by steam or other heating coils, and the immersion heater 67 could be under control of the thermostat 64 or the thermostat 68 could be arranged in the body 17 of spray water, the air stream, or the fluid line 14, reference being made to the Olstad and Williams Patents Nos. 2,296,946 and 2,321,933 for such modifications of the control.

In the operation of the form of the invention shown in Figs. 1–3, the cutting fluid or compound collects in the pan 12 of the machine tool or other apparatus and is withdrawn by the pump 13 from which it is forced through the pipe 14 into the inlet pipe 45 of the inlet header 40. From this inlet header the fluid is discharged through the various spiral tubes 43 of the coil 38 and passes into the outlet header 42 and through its outlet pipe 46 into the pipe 11 from which the cutting fluid is discharged against the piece of work being operated upon in the machine tool 10. Smudge laden air is at the same time being drawn by the fan 25 from the zone of operation of the machine tool 10 into the duct 66 and through the air filter 65 which removes the dirt, dust and smudge and purifies the air. From this filter the air is drawn by the fan 25, through the air inlet duct 21 into the upper chamber 19a, the fan 25 forcing this air downwardly around the tubes 43 of the cooling coil 38 and around the underside of the vertical partition 18 into the air discharge passage 20. From the upper end of this air discharge passage the air is discharged back into the enclosure through the air discharge duct 22. At the same time the frusto-conical pump shell 50 is rotating with this shaft 26 and since this pump shell 50 is of upwardly enlarging tapering form, water is drawn from the body 17 in the tank 16 up through this shell and discharged horizontally outward from its upper end against the frusto-conical stationary baffle 51, this water being thereby deflected downwardly upon the tubes 43 of the cooling coil 38 so as to flush these tubes in a wetted condition. This water evaporates on these tubes, the tubes 43 tending to assume the wet bulb temperature of the air forced downwardly around these tubes by the fan 25. The fluid passing through the tubes 43 of the cooling coil is thereby subjected to evaporative cooling before being returned to the machine tool.

Under heavy load conditions, where the maximum cooling effect upon the fluid under treatment is desired, the damper 54 is held in the vertical condition shown in which the air inlet and outlet ducts are substantially segregated from each other so that only fresh air is passed through the apparatus. With a decrease in the cooling load upon the apparatus, the falling temperature of the leaving fluid under treatment actuates the thermostat 64 and the damper motor 62 to move the damper 54 from the full line position shown in Fig. 2 toward the dotted line position there shown. When this occurs recirculated air from the air discharge passage 20 is drawn, together with fresh air from the air intake duct 21, into the chamber 19a by the fan 25 and passed through the cooling coil 38. Since this recirculated air withdrawn from the air discharge passage 20 has been heated by passing the bank of tubes 43 and also is substantially saturated with the moisture evaporated in passing through these flooded coils, it will be seen that the mixed fresh and recirculated air now supplied to the chamber 19a has a higher wet bulb temperature and hence the evaporative cooling effect of the water and air passing over the bank of coils or tubes 43 is reduced. It will therefore be seen that the immersion thermostat 64 in the fluid line 11 maintains a substantially constant temperature of the fluid by the operation of the damper 54, opening this damper when the temperature of the fluid falls below that desired and closing this damper when greater cooling is required.

At the start of an operation, or if at any time the temperature of the cutting oil or other fluid being treated drops below the proper temperature, the immersion thermostat 68 in the fluid line 11 acts through its control line 69 to energize the immersion heater 67. This heats the body of spray water 17 and since this spray water is being sprayed over the coils 43, this spray water heats the fluid passing through these coils so as to bring this fluid up to the proper operating temperature. The thermostatically controlled immersion heater thereby serves to insure that the fluid under treatment never falls below the proper operating temperature under any condition.

In the form of the invention shown in Figs. 4 and 5 the casing 70 is of semi-cylindrical form, having a rectangular rear wall 71, straight side walls 72, a semi-cylindrical front wall 73 and bottom and top walls 74 and 75. As with the form of the invention shown in Figs. 1–3 the bottom part of the casing is formed to provide a tank containing a body of water 76 which is evaporated to provide the cooling effect. Toward the rear wall 71 of the casing is secured a vertical partition 80 which extends from one side wall 72 to the other and which terminates a substantial distance above the level of the body of water 76. This partition 80 provides a relatively large working chamber 81 and an air passage 82 in the rear of the casing. The upper end of the air passage 82 is divided by a vertical central partition 84 into an air discharge duct 85 and an air inlet duct 86. The air discharge duct 85 communicates through an opening 88 with the upper end of the working chamber 81 and also with the air passage 82, the latter communication being under control of a damper as hereinafter described.

The means for drawing air in through the air inlet duct 86, into the working chamber 81 and discharging the air around the underside of the partition 80 and out through the air passage 82 and air discharge duct 85 comprises a fan 90 mounted on a vertical fan shaft 92 and which also forms the shaft for a motor 93 mounted on the top wall 75 of the casing. The fan is shown as being of the centrifugal type and as arranged immediately above an opening 95 in a horizontal partition 96 which divides the working chamber 81 into upper and lower chambers 81a and 81b. This opening 95 forms the eye of the fan.

Mounted within the lower chamber 81b is a cooling coil indicated generally at 98. This cooling coil is of substantially the same form as with the form of the invention shown in Figs. 1–3, having a fluid inlet 99 leading to a vertical inlet header 100 of tubular form arranged adjacent the fan shaft 92, and having a similar outlet header (not shown) from which fluid to be cooled is discharged through an outlet pipe 104 connecting with an outlet line 105. These headers are connected by a plurality of spiral tubes 101 and preferably arranged in substantially uniformly spaced relation to one another to permit the flow of air over their external surfaces. As with the form of the invention shown in Figs. 1–3, this coil assembly can be supported on angle irons 102 secured to the casing 70 and partition 80 and is shown as surrounded by a cylindrical sheet metal shell 103 which rests upon the angle irons 102 and serves to insure that the air flowing vertically through the lower part 81b of the working chamber is constrained to pass in intimate contact with the tubes of the cooling coil 98.

As with the form of the invention shown in Figs. 1–3, the cooling effect is provided principally by the evaporation of water and for this purpose water is lifted from the body of water 76 in the bottom of the casing and discharged over the tubes 101 of the cooling coil 98 so as to keep these tubes constantly flushed with water, the excess water flowing back into the body of water 76.

For this purpose a pump is provided which is in the form of a frusto-conical shell 110 secured in any suitable manner to the lower end of the fan shaft 92 and having its lower end of reduced diameter immersed in the body of water 76. The upper end of this frusto-conical shell or sleeve is arranged above the level of the cooling coil 98 and the water drawn up the inside of the revolving shell 110 by centrifugal force is therefore spread over the cooling coil 98 so as to keep it wet.

Means are provided for delivering different proportions of outside air from the inlet duct 86 and recirculated air from the air discharge passage 84 into the lower chamber 81b, the flow of air being in reverse to that shown in Figs. 1-3. For this purpose a single damper shaft 115 extends horizontally across the air passage 82 parallel with the partition 80 and also extends through the lower part of the partition 84 in this passage 82. Within the air inlet passage 86 a damper 116 is mounted on this damper shaft 115 and within the air discharge passage 85 a damper 117 is mounted on this shaft. The dampers 116 and 117 are arranged to work in inverse relation to each other and hence are set at a 90° angle to each other. The damper shaft is actuated by a lever arm 118 which can be actuated by a damper motor (not shown) in the same manner as with the damper motor 62 in the form of the invention shown in Figs. 1-3.

In order to prevent entrained water from being drawn up into the fan 90 with the stream of air drawn into the fan, an eliminator 120 of any suitable form is preferably arranged in the upper part of the chamber 81b and through which the air is required to pass. This eliminator is shown as made of V-shaped plates whereby the air is whipped back and forth so that any entrained water is caught by the plates and returned to the bottom of the casing.

The control for the form of the invention shown in Figs. 4 and 5 can be the same as that described with reference to Figs. 1-3. Thus the dampers 116 and 117 can be actuated in response to temperature changes in the spray water, air, or fluid being treated and an electric heater 125 is shown as immersed in the body 76 of spray water in the tank 74 and as controlled through a line 126 from an immersion thermostat 127 in the fluid line 105. This heater and thermostat acts in the same manner as the immersion heater 67 and thermostat 68 in Figs. 1-3 to prevent the temperature of the fluid under treatment from ever dropping below a predetermined minimum and thereby insures that the fluid is always held in a closely controlled temperature range.

In the operation of the form of the invention shown in Figs. 4 and 5, the fluid to be cooled is passed from the inlet pipe 99 through the tubes 101 of the coil 98 and is discharged through the outlet line 104 and pipe 105. Fresh or outside air is drawn in through the inlet duct or passage 86 into the air passage 82, around the underside of the vertical partition 80 up through the cylindrical shell 103 in intimate contact with the tubes 101 of the cooling coil 98, past the eliminator 120 and into the inlet or eye 95 of the fan 90. This fan discharges the air into the chamber 81a from which it passes through the opening 88 into the air discharge duct 85.

At the same time the frusto-conical pump shell 110 secured to the lower end of the fan shaft 92 is rotating and since this pump shell is of upwardly enlarging tapering form, water is drawn from the body 76 in the bottom of the casing and is discharged horizontally outward from its upper end over the tubes 101 of the coil 98 so as to constantly flush these tubes and maintain them in a wetted condition. This water evaporates on these tubes, the tubes tending to assume the wet bulb temperature of the air admitted to the lower end of the chamber 81b. The fluid to be cooled passing through the tubes 101 of the cooling coil is to be subjected to evaporative cooling.

Under heavy load conditions, where maximum cooling effect upon the cutting fluid is desired, the fresh air damper 116 is opened and the recirculated air damper 117 is closed, the air thereby flowing through the path which was described. With a decrease in load upon the apparatus, the damper shaft 115 can be set, either manually or automatically as by the damper motor 62 shown in Fig. 1, so as to move the fresh air damper 116 toward a closed position and so as to move the recirculated air damper 117 toward its open position, this position of these dampers being shown in Fig. 4. When this occurs, recirculated air from the chamber 81a is drawn, together with fresh air from the inlet duct 86, into the air passage 82 and is passed through the cooling coil 98. Since this recirculated air withdrawn from the upper chamber 81a has been heated by passing the bank of tubes 101 and also is substantially saturated with the moisture evaporated in passing around these flooded tubes, it will be seen that the mixed fresh and recirculated air now supplied to the lower end of the chamber 81b has a higher wet bulb temperature and hence that the evaporative cooling effect of the water and air passing over the bank of coils or tubes 101 is reduced. It will therefore be seen that the adjustment of the dampers 116 and 117 determines the effective cooling performed by the apparatus and that this can be held within very close limits.

At the start of an operation or if at any time the temperature of the fluid under treatment drops below the proper working temperature, the immersion thermostat 127, through its control line 126, energizes the electric immersion heater 125 thereby to heat the body of spray water 76. Since this spray water is being sprayed over the coils 101, it will be seen that the temperature of the liquid being treated is thereby automatically restored to its proper operating minimum.

From the foregoing it will be seen that the present invention provides a very simple, inexpensive and rugged heat exchanger of the evaporative type which is particularly adapted for relatively small units. It will further be seen that the evaporator can be used both to cool the fluid supplied to a part being processed for the purpose of cooling the part and also for purifying the dirt, dust and smudge laden air resulting from such processing. It will further be seen that the apparatus is free from operating difficulties and will stand up under conditions of severe and constant use without requiring repair.

We claim as our invention:

1. A heat exchange device for cooling a stream of fluid, comprising an enclosing casing having top, bottom and side walls, a vertical partition extending across the interior of said casing and extending downwardly short of the bottom thereof, said vertical partition providing a working chamber on one side and an air passage on its opposite side, an air duct connected with the upper end of said air passage, an air duct connected with the upper part of said working chamber, a fan arranged to force a stream of air through said air ducts, air passage, working chamber and under said partition, a cooling coil arranged in said working chamber and in the stream of air passing therethrough, means for discharging and distributing water over said cooling coil to wet the exterior of said cooling coil and to evaporate and absorb heat therefrom, and means for conducting the said stream of fluid to be cooled through said cooling coil.

2. A heat exchange device for cooling a stream of fluid, comprising an enclosing casing having top, bottom and side walls, a vertical partition extending across the interior of said casing and extending downwardly short of the bottom thereof, said vertical partition providing a working chamber on one side and an air passage on its opposite side, an air duct connected with the upper end of said air passage, an air duct connected with the upper part of said working chamber, a horizontal partition arranged across the upper part of said working chamber and spaced from the top of said casing, said horizontal partition being provided with an opening forming the eye of a fan, a fan wheel rotating about a vertical axis concentric with said opening and drawing air therethrough to force a stream of air through said air ducts, air passage, working chamber and under said partition, a cooling coil arranged in said working chamber below said horizontal partition and in the stream of air passing therethrough, means for discharging and distributing water over said cooling coil to wet the exterior of said cooling coil and to evaporate and absorb heat therefrom, and means for conducting the said stream of fluid to be cooled through said cooling coil.

3. A heat exchange device for cooling a stream of fluid, comprising an enclosing casing, a vertical partition extending across the interior of said casing and extending downwardly short of the bottom thereof, said vertical partition providing a working chamber on one side and an air passage on its opposite side, an air duct connected with said air passage, an air duct connected with the upper part of said working chamber, a fan shaft extending vertically through said working chamber, means for rotating said fan shaft, a fan wheel fast to said fan shaft and arranged in the upper part of said working chamber and forcing a stream of air through said air ducts, air passage, working chamber and under said partition, a cooling coil arranged in the lower part of said working chamber around said fan shaft and in the stream of air passing through said working chamber, said casing being formed to provide a tank for retaining a body of water at its bottom, means carried by said fan shaft for elevating water from said body and discharging and distributing said water over said cooling coil to wet the exterior of said cooling coil and to evaporate and absorb heat therefrom, and means for conducting the said stream of fluid to be cooled through said cooling coil.

4. A heat exchange device for cooling a stream of fluid, comprising an enclosing casing, a vertical partition extending across the interior of said casing and extending downwardly short of the bottom thereof, said vertical partition providing a working chamber on one side and an air passage on its opposite side, an air duct connected with said air passage, an air duct connected with the upper part of said working chamber, a fan shaft extending vertically through said working chamber, means for rotating said fan shaft, a fan wheel fast to said fan shaft and arranged in the upper part of said working chamber and forcing a stream of air through said air ducts, air passage, working chamber and under said partition, a cooling coil arranged in the lower part of said working chamber around said fan shaft and in the stream of air passing through said working chamber, said casing being formed to provide a tank for retaining a body of water at its bottom, a frusto-conical sleeve fast to the lower end of said fan shaft and having its lower reduced end immersed in said body of water thereby to elevate said water and discharge and distribute said water over said cooling coil to wet the exterior of said cooling coil and to evaporate and absorb heat therefrom, and means for conducting the said stream of fluid to be cooled through said cooling coil.

5. A heat exchange device for cooling a stream of fluid, comprising an enclosing casing, a vertical partition extending across the interior of said casing and extending downwardly short of the bottom thereof, said vertical partition providing a working chamber on one side and an air passage on its opposite side, an air duct connected with said air passage, an air duct connected with the upper part of said working chamber, a horizontal partition arranged across the upper part of said working chamber and spaced from the top of said casing, said horizontal partition being provided with an opening forming the eye of a fan, a fan shaft extending vertically through said working chamber and said opening, means for rotating said fan shaft, a fan wheel fast to said shaft adjacent said opening and drawing air therethrough to force a stream of air through said air ducts, air passage, working chamber and under said vertical partition, a cooling coil arranged in said working chamber below said horizontal partition and in the stream of air passing therethrough, said casing being formed to provide a tank for retaining a body of water in its bottom, means carried by said fan shaft for elevating said water and discharging it between said horizontal partition and said cooling coil to be distributed over said cooling coil to evaporate and absorb heat therefrom, and means for conducting the stream of fluid to be cooled through said cooling coil.

6. A heat exchange device for adjustably cooling a stream of fluid, comprising an enclosing casing, partition means within said casing and forming an air inlet passage, a working chamber and an air outlet passage, a fan in said working chamber arranged to force a stream of air successively through said air inlet passage, working chamber and air outlet passage, a cooling coil arranged in said working chamber and in the stream of air passing therethrough, means for discharging and distributing water over said cooling coil to wet the exterior of said cooling coil and to evaporate and absorb heat therefrom, means for conducting the said stream of fluid to be cooled through said cooling coil, and means for adjusting the temperature of the leaving fluid, comprising an opening in said partition between said air inlet passage and said air outlet passage and through which air can recirculate from said air outlet passage to said air inlet passage, a damper shaft extending across said opening, damper means fast to said damper shaft and regulating the proportion of air discharged from said air discharge passage and through said recirculated air opening, and means for adjusting said damper shaft.

7. A heat exchange device for adjustably cooling a stream of fluid, comprising an enclosing casing, a vertical partition across the interior of said casing and extending downwardly short of the bottom thereof, said vertical partition providing a working chamber on one side and an air passage on its opposite side, an air inlet duct connected with the upper end of said air passage, an air outlet duct connected with the upper part of said working chamber immediately adjacent said partition, a fan arranged to move a stream of air from said air inlet duct downwardly through said air passage, around the underside of said partition, upwardly through said working chamber and out through said air outlet duct, a cooling coil arranged in said working chamber and in the stream of air passing therethrough, means for discharging and distributing water over said cooling coil to wet the exterior of said cooling coil and to evaporate and absorb heat therefrom, means for conducting the said stream of fluid to be cooled through said cooling coil, and means for adjusting the temperature of the leaving fluid, comprising an opening in said partition between the upper part of said chamber and the upper end of said air passage, a damper pivoted centrally in said opening and having one part swinging to restrict the flow of air out through said outlet duct and means for adjusting said damper.

8. A heat exchange device for adjustably cooling a stream of fluid, comprising an enclosing casing, a vertical partition across the interior of said casing and extending downwardly short of the bottom thereof, said vertical partition providing a working chamber on one side and an air passage on its opposite side, a vertical partition extending transversely across the upper part of said air passage and providing an air inlet duct on one side and an air outlet duct on the other side, said first vertical partition being providing with an opening leading from the upper part of said working chamber to said air outlet duct, a damper shaft extending across said air passage parallel with said first partition, a damper fast to said damper shaft and arranged to restrict the flow of air from said air inlet duct into said air passage, a second damper fast to said damper shaft and at an angle to said first damper and arranged to restrict the flow of air from said air outlet duct into said air passage, a fan arranged to move a stream of air from said air inlet duct, downwardly through said air passage, around the underside of said partition, upwardly through said working chamber and out through said air outlet duct, a cooling coil arranged in said working chamber and in the stream of air passing therethrough, means for discharging and distributing water over said cooling coil to wet the exterior of said cooling coil and to evaporate and absorb heat therefrom, means for conducting the said stream of fluid to be cooled through said cooling coil, and means for adjusting said damper shaft to adjust the temperature of the leaving fluid.

9. In combination with a machine tool which changes the form of a part being operated on and which requires the application of a stream of fluid on the part being operated on resulting in the generation of dirt, dust or smudge in the air surrounding the zone of operation of said machine tool on said part, means forming a chamber having an air inlet and an air outlet, a fan arranged to force a stream of air from said inlet, through said chamber and out through said outlet, a cooling coil arranged in the stream of air passing through said chamber, means discharging and distributing a stream of water over said cooling coil to wet the exterior of said cooling coil and to evaporate and absorb heat therefrom, means conducting said stream of fluid to be cooled through said cooling coil thereby to cool said stream of fluid before said application to said part, and means conducting said dirt, dust or smudge laden air from said zone of operation to said air inlet thereby to purify the dirt, dust or smudge laden air resulting from said operation.

10. In combination with a machine tool which changes the form of a part being operated on and which requires the application of a stream of fluid on the part being operated on resulting in the generation of dirt, dust or smudge in the air surrounding the zone of operation of said machine tool on said part, apparatus for cooling said stream of fluid and for purifying the dirt, dust or smudge laden air resulting from said operation, comprising means forming a chamber having an air inlet and an air outlet, a fan arranged to force a stream of air from said inlet, through said chamber and out through said outlet, a cooling coil arranged in the stream of air passing through said chamber, means discharging and distributing a stream of water over said cooling coil to wet the exterior of said cooling coil and to evaporate and absorb heat therefrom, means conducting said stream of fluid to be cooled through said cooling coil, and means conducting said dirt, dust or smudge laden air from said zone of operation on said part to said air inlet.

11. In combination with a machine tool which changes the form of a part being operated on and which requires the application of a stream of fluid on the part being operated on resulting in the generation of dirt, dust or smudge in the air surrounding the zone of operation of said machine tool on said part, means forming a chamber having an air inlet and an air outlet, a fan arranged to force a stream of air from said inlet, through said chamber and out through said outlet, a cooling coil arranged in the stream of air passing through said chamber, means discharging and distributing a stream of water over said cooling coil to wet the exterior of said cooling coil and to evaporate and absorb heat therefrom, means conducting said stream of fluid to be cooled through said cooling coil thereby to cool said stream of fluid before said application to said part, a duct conducting said dirt, dust and smudge laden air from said zone of operation to said air inlet whereby said air from said zone of operation is drawn into said chamber by said fan, and an air filter in the path of the air so drawn through said duct thereby to purify the dirt, dust or smudge laden air resulting from said operation.

12. In combination with a machine tool which changes the form of a part being operated on and which requires the application of a stream of fluid on the part being operated on resulting in the generation of dirt, dust or smudge in the air surrounding the zone of operation of said machine tool on said part, means forming a chamber having an air inlet and an air outlet, a fan arranged to force a stream of air from said inlet, through said chamber and out through said outlet, a cooling coil arranged in the stream of air passing through said chamber, means discharging and distributing a stream of water over said cooling coil to wet the exterior of said cooling coil and to evaporate and absorb heat therefrom, means at the bottom of said chamber collecting said spray water, means recirculating said collected spray water through said discharging and distributing means, means conducting said stream of fluid to be cooled through said cooling coil thereby to cool said stream of fluid before application to said part, a duct connected with said air inlet, a hood connected with the other end of said duct and arranged over said zone of operation whereby the air from said zone of operation is drawn through said chamber by said fan, and an air filter in the path of the air so drawn through said duct thereby to purify the dirt, dust or smudge laden air resulting from said operation.

13. In combination with a machine tool which changes the form of a part being operated on and which requires the application of a stream of fluid on the part being operated on resulting in the generation of dirt, dust or smudge in the air surrounding the zone of operation of said machine tool on said part, means forming a chamber having an air inlet and an air outlet, a fan arranged to force a stream of air from said inlet, through said chamber and out through said outlet, a cooling coil arranged in the stream of air passing through said chamber, means discharging and distributing a stream of water over said cooling coil to wet the exterior of said cooling coil and to evaporate and absorb heat therefrom, means conducting said stream of fluid to be cooled through said cooling coil thereby to cool said stream of fluid before said application to said part, said streams of air and water normally being heated through heat derived from said stream of fluid passing through said cooling coil, air recirculation means for conducting a part of the stream of air leaving said chamber back to said air inlet, thermostat means responsive to the temperature of one of said streams to adjust the amount of air so conducted back by said air recirculation means to maintain the temperature of said stream of fluid in a selected temperature range, and means conducting said dirt, dust or smudge laden air from said zone of operation to said air inlet thereby to purify the dirt, dust or smudge laden air resulting from said operation.

PAUL H. SCHOEPFLIN.
CHARLES N. DEVERALL.
ROBERT C. STUTZ.